United States Patent
Wigren et al.

(10) Patent No.: US 8,489,098 B2
(45) Date of Patent: Jul. 16, 2013

(54) METHOD AND ARRANGEMENT FOR REAL-TIME DIFFERENCE DETERMINATION FOR MOBILE TERMINAL POSITIONING

(75) Inventors: Torbjörn Wigren, Uppsala (SE); Ari Kangas, Lidingö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 22 days.

(21) Appl. No.: 13/148,190

(22) PCT Filed: Mar. 20, 2009

(86) PCT No.: PCT/SE2009/050299
§ 371 (c)(1),
(2), (4) Date: Aug. 5, 2011

(87) PCT Pub. No.: WO2010/093299
PCT Pub. Date: Aug. 19, 2010

(65) Prior Publication Data
US 2011/0294510 A1 Dec. 1, 2011

Related U.S. Application Data

(60) Provisional application No. 61/152,520, filed on Feb. 13, 2009.

(51) Int. Cl.
*H04W 88/02* (2009.01)
(52) U.S. Cl.
USPC .......................................................... 455/436
(58) Field of Classification Search
USPC ................................. 455/436–444
See application file for complete search history.

(56) References Cited

U.S. PATENT DOCUMENTS

| 2004/0051663 | A1 | 3/2004 | Martikkala | |
|---|---|---|---|---|
| 2010/0273504 | A1* | 10/2010 | Bull et al. | 455/456.1 |
| 2012/0120938 | A1* | 5/2012 | Mueck et al. | 370/338 |

FOREIGN PATENT DOCUMENTS

| WO | 98/52376 | | 11/1998 |
|---|---|---|---|
| WO | 99/06851 | | 2/1999 |
| WO | 99/53708 | | 10/1999 |
| WO | 01/95659 | A1 | 12/2001 |
| WO | 2006/026816 | A2 | 3/2006 |

* cited by examiner

*Primary Examiner* — Diane Mizrahi
(74) *Attorney, Agent, or Firm* — Coats & Bennett, P.L.L.C.

(57) ABSTRACT

In a method of providing real time difference determination for a mobile terminal in a telecommunication system, comprising a plurality of eNodeBs in communication with a core network, each eNodeB having a plurality of associated cells, each cell potentially servicing one or more mobile terminals, determining S10 a first timing advance value representative of a first geographical distance measure between the mobile terminal and a first serving eNodeB prior to a handover to a second serving eNode B, determining S20 a second timing advance value representative of a second geographical distance measure between the mobile terminal and the second eNodeB after the handover. Subsequently, determining S30 a time of arrival measure between the mobile terminal and at least two eNodeBs, and signaling S40 representations of the determined first and second geographical distance measures and the determined time of arrival measures for said mobile terminal to at least said second eNodeB, together with a respective unique identification parameter of the at least two eNodeBs, wherein determination of real time differences is enabled based on at least the signaled representations.

26 Claims, 5 Drawing Sheets

METHOD AND ARRANGEMENT FOR REAL-TIME DIFFERENCE DETERMINATION FOR MOBILE TERMINAL POSITIONING

TECHNICAL FIELD

The present invention relates to telecommunication systems in general, specifically to improved position determination of mobile terminals in long time evolution (LTE) cellular telecommunication systems.

BACKGROUND

The possibility to determine the position of a mobile device has enabled application developers and wireless network operators to provide location based, and location aware, services. Examples of those are guiding systems, shopping assistance, friend finder and other information services giving the mobile user information about their surroundings.

In addition to the commercial services, the governments in several countries have also put requirements on the network operators to be able to determine the position of an emergency call. For instance, the governmental requirements in USA (FCC E911) requires that it must be possible to determine the position of a certain percentage of all emergency calls, with a pre-specified accuracy and within a pre-specified time. There is no difference between the requirements put on indoor environments compared to outdoor environments.

In outdoor environments, the position estimation can be done using external methods for position determination, e.g. GPS (Global Positioning System) based methods like Assisted-GPS (A-GPS). Position estimation can also be performed using the wireless network itself. Methods using the wireless network can be grouped in two main groups. The first group comprises methods that are based on the radio cell, to which a mobile terminal is attached, e.g. by using Cell-ID. The second group uses measuring of radio signals from several base stations (BS) and determining the terminal position using e.g. measured Time Differences (TDs).

In order to be able to connect to a mobile network or to perform handover when connected, a mobile terminal typically constantly measures available downlink signals, not only from its own base station, but also from other base stations. These signals are typically control signals intended for measuring radio conditions of transmissions, which control signals contain, among other data, information about how to establish a connection to the transmitting base station. In particular, the control signals comprise data, which by itself or in combination with the frequency of the carrier on which the control signal was transmitted constitute base station identification data. A mobile terminal can thus obtain an identity of the transmitting base station and an estimate of the radio conditions. The mobile terminal typically compiles this information, in GSM (Global System for Mobile communications) in a neighbor cell list, which is transferred to the network as information.

Position estimation can be based on measurements, listed in the neighboring list. One then uses the relation between the distance from the radio base station and the radio condition in combination with knowledge about the exact position of the base station. The base station positions are known within the communications network. This means that the neighbor list easily can be used for position estimating according to different algorithms. The accuracy of the position estimation is often proportional to the size of the cell, in particular when signal strength measurements are used.

Trilateration, or Time Difference (TD) methods, use signals associated with two or more different base stations. These signals are used to calculate the position or at what distance from the base station a mobile terminal is located. The calculations are based on the relative difference in time or the absolute in the time it takes the signal to propagate between the different base stations and the terminal. The achievable accuracy of TD-methods depends on system architecture, physical conditions, and radio conditions. Typically, the accuracy of a TD method in a mobile telephony system is 50 to 300 meters. TD methods are also costly and resource consuming to implement and manage.

In order to provide accurate positioning of mobile terminals it is also necessary to be able to determine time of transmission differences between the mobile terminal and the base stations in the system. In addition, real time differences between transmission times of different base stations need to be determined. Consequently, there is a need for means and methods for determining time of transmission differences and real time differences that enable an improved positioning.

SUMMARY

A general object of the present invention is to provide improved positioning of mobile terminals in cellular systems, particularly for the long term evolution systems.

Basically, the disclosure provides a method of providing real time difference determination for a mobile terminal in a telecommunication system, the system comprising a plurality of eNodeBs in communication with a core network, each eNodeB having a plurality of associated cells, each cell potentially servicing one or more mobile terminals, the method comprises the steps of initially determining S10 a first timing advance value representative of a first geographical distance measure between the mobile terminal and a first serving eNodeB prior to a handover to a second serving eNode B. Subsequently, determining S20 a second timing advance value representative of a second geographical distance measure between the mobile terminal and the second eNodeB after the handover. In addition, determining S30 a time of arrival measure between the mobile terminal and at least two eNodeBs, and finally signaling S40 representations of the determined first and second geographical distance measures and the determined time of arrival measures for the mobile terminal to at least the second eNodeB, together with a respective unique identification parameter of the at least two eNodeBs, wherein determination of real time differences is enabled based on at least the signaled representations.

Additionally, the disclosure provides an arrangement for providing real time difference determination for a mobile terminal in a telecommunication system, the system comprising a plurality of eNodeBs in communication with a core network, each eNodeB having a plurality of associated cells, each cell potentially servicing one or more mobile terminals, the arrangement comprises a distance determinator 10 configured for determining a first timing advance value representative of a first geographical distance measure between the mobile terminal and a first serving eNodeB prior to a handover to a second serving eNode B, the distance determinator is further configured for determining a second timing advance value representative of a second geographical distance measure between the mobile terminal and the second eNodeB after the handover. In addition, the arrangement comprises a timer 30 configured for determining a time of arrival measure between the mobile terminal and at least two eNodeBs, and a signal unit 40 configured for signaling representations of the determined first and second geographical distance measures and the determined time of arrival measures for the mobile terminal to at least the second eNodeB, together with a respective unique identification parameter of each of the at least two eNodeBs, wherein determination of real time differences is enabled based on at least the signaled representations.

Advantages of the present disclosure include improved positioning of mobile terminals in LTE systems.

BRIEF DESCRIPTION OF THE DRAWINGS

The invention, together with further objects and advantages thereof, may best be understood by referring to the following description taken together with the accompanying drawings, in which.

| ABBREVIATIONS | |
|---|---|
| BS | Base Station |
| CN | Core Network |
| LTE | Long Time Evolution |
| RAN | Radio Access Network |
| RRC | Radio Resource Control |
| RRM | Radio Resource Management |
| TA | Timing Advance |
| TDOA | Time Difference Of Arrival |
| TOA | Time Of Arrival |

Time Difference of Arrival Positioning

Positioning Principle The so-called time difference of arrival (TDOA) method relies on measurements, typically on some pilot radio signal, from multiple base stations e.g. eNodeBs. The measurements are performed by means of correlation with the known signals of the base stations measured upon. The situation is depicted in FIG. 1.

Figure 1:
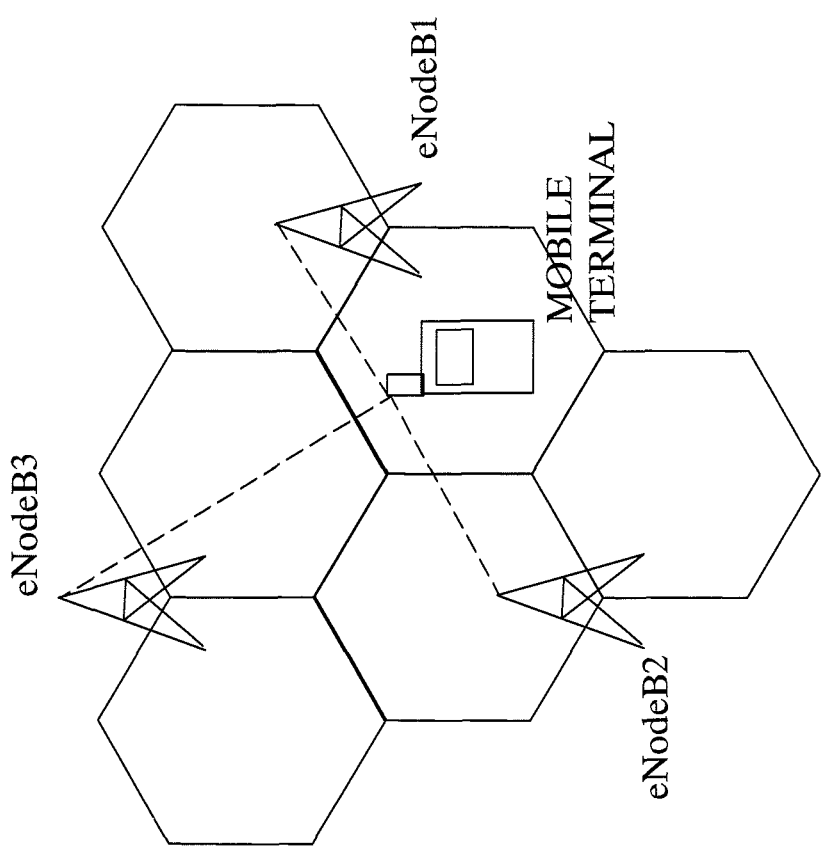
FIG. 1 is a schematic illustration of the cellular structure of a telecommunication system.

FIG. 1 discloses a general telecommunication system, for simplicity reasons depicted as three base stations each within range of a mobile terminal. Each base station is associated with three cells.

Assuming that the measurement are successful for a number of cells, three of which are depicted in FIG. 1, the following relations between the measured time of arrivals (TOA) in the mobile terminal, the transmission times from the base stations (NodeBs) and the distances between the mobile terminal and the respective base stations follow:

$$t_{DOA,1} + b_{clock} = T_1 + \|r_1 - r_{Terminal}\|/c \tag{1}$$

$$\vdots$$

$$t_{DOA,n} + b_{clock} = T_n + \|r_n - r_{Terminal}\|/c. \tag{2}$$

Here $t_{TOA,i}$, i=1,K,n denotes the measured time of arrivals (TOAs) in the mobile terminal, $T_i$, i=1,K,n denotes the transmission times from the eNodeB:s and c is the speed of light. The boldface quantities are the (vector) locations of the base stations and the mobile terminal. $b_{clock}$ denotes the unknown clock bias of the mobile terminal with regard to a cellular system time. Now, in TDOA positioning, time of arrival (TOA) differences with respect to the own (serving) site are formed according to $$t_{TDOA,2} = t_{TOA,2} - t_{TOA,1} = T_2 - T_1 + \|r_2 - r_{Terminal}\|/c - \|r_1 - r_{Terminal}\|/c \tag{3_2}$$

$$\vdots$$

$$t_{TDOA,n} = t_{DOA,n} - t_{TOA,1} = T_n - T_1 + \|r_n - r_{Terminal}\|/c - \|r_1 - r_{Terminal}\|/c. \tag{3_n}$$

DETAILED DESCRIPTION

The present disclosure relates to position determination of terminals of the long term evolution (LTE) cellular system. More particularly, the disclosure relates to position determination with so-called observed time difference of arrival (TDOA) positioning methodology, applied in the downlink. Such methods solve systems of nonlinear equations, usually with optimization techniques, in order to compute the position of the terminal. The system of equations relate the observed time of arrivals for multiple base stations, the times of transmission from the same multiple base station and the distance between the terminal and each of the multiple base stations. Normally, hyperbolic time-difference of arrival equations are formed, in order to handle the fact that terminals may experience an individual clock bias, wrt the network.

Below follows a background to TDOA positioning and the procedures employed to estimate the synchronization information needed, to provide an in depth understanding of the problems of prior art and the specific solution according to the present invention.

In these n−1 equations, the left hand sides are known (with some additional measurement error). The distance dependent terms then become defined, provided that the time of transmission differences (denoted the real time differences) can be measured. The present invention discloses methods and arrangements for the solution of this particular problem. Further the locations of the base stations, $r_i$, i=1,K,n, can be surveyed to within a few meters and so they are known as well. What remains unknown is the mobile terminal location, i.e.

$$r_{Terminal} = (x_{Terminal} \, y_{Terminal} \, z_{Terminal})^T \tag{4}.$$

In the more common case a two dimensional positioning is performed the unknown position is instead $$r_{Terminal} = (x_{Terminal} \, y_{Terminal})^T \tag{5}.$$

It then follows that at least three time of arrival differences are needed in order to find a 3D terminal position and that at least two time of arrival differences are needed in order to find a 2D terminal position. This, in turn, means that at least four sites need to be detected for 3D terminal positioning and at least three sites need to be detected for 2D terminal positioning. In practice, accuracy can be improved if more measurements are collected and a maximum likelihood solution is introduced. There may also be multiple (false) solutions in cases where only a minimum number of sites are detected.

Figure 2:
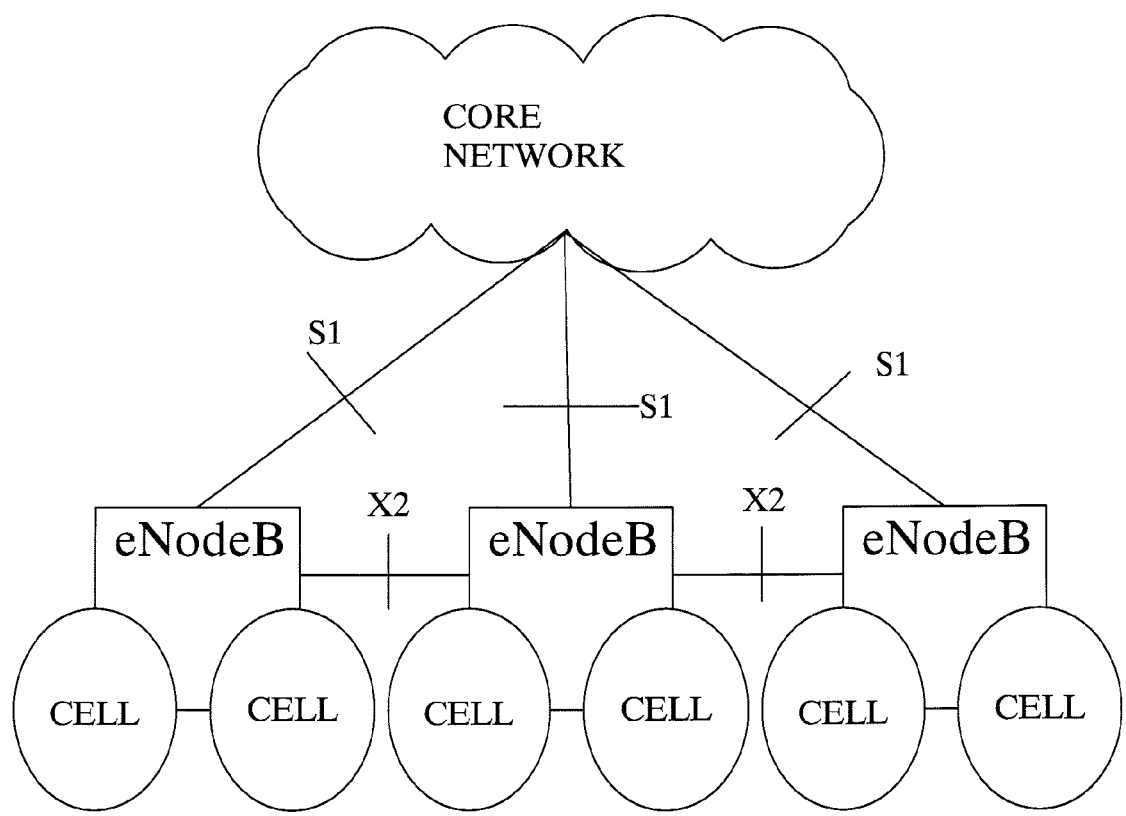
FIG. 2 is a schematic diagram of a LTE radio access network in which the present invention can be implemented.

With reference to FIG. 2, a general long term evolution (LTE) radio access network system will be described [2]. Basically, the system comprises a plurality of eNodeB:s, each eNodeB being in charge of a set of cells. A eNodeB is typically in charge of single cell radio resource management (RRM) decisions, handover decisions, scheduling of users in both uplink and downlink in its cells. It also performs classical physical layer functions of coding, decoding, modulation, demodulation, interleaving, de-interleaving etc. Each eNodeB is connected to a core network using the so called S1 interface. In addition, each eNodeB is connected to any eNodeB in the network using the so called X2 interface. The X2 interface is typically used to support active-mode mobility, but can additionally be used for multi-cell RRM functions.

The need for synchronization or establishment of time of transmission differences Studying the time difference of arrival equations showed earlier, it follows that there are more equations than unknowns if
  a. the real time differences are zero, i.e. the LTE network is synchronized (sufficiently accurately, normally meaning to within a few tens of nanoseconds).
  b. the real time differences are estimated by other means.

The present invention aims at providing methods and arrangements that enable a determination of real time differences for a mobile terminal in a telecommunication system e.g. LTE. Several problems need to be solved to achieve this goal. First of all, a principle to determine the real time differences needs to be found. Then the necessary measurement and signalling means would need to be determined. The present invention focuses on the latter aspect.

One such principle aims at measuring the time of arrivals (TA) in the terminal at times when the distance between the transmitting or serving base station and the terminal is known. That would allow a solution of the time difference of arrival (TDOA) equations for the real time differences. This requires that (brief overview, followed by detailed discussion):
1) The TOA(s), or differences of TOAs are measured in the terminal.
2) The TOA(s), or differences of TOAs are signalled from the terminal to the eNodeB of the LTE system, over the RRC (LTE) interface; the new information elements also providing IDs of said base stations.
3) The TOA(s), or differences of TOAs are signalled from eNodeBs to eNodeBs of the LTE system, over the X2 (LTE) interface; the new information elements also providing IDs of said base stations.
4) The TOA(s), or differences of TOAs are optionally signalled from the LTE RAN to a CN node; the new information elements also providing IDs of said base stations.
5) The distance between the transmitting eNodeBs and the terminal are determined by
  a. Using terminals or dedicated location measurement units at pre-specified and carefully surveyed geographical positions, together with carefully surveyed eNodeB positions.
  b. Using the timing advance (TA) measurement to establish an approximate distance between the terminal and the serving base station, by a multiplication of the TA value with the speed of light; said TA values being measured before and after a handover, thereby also directly establishing a real time difference; said use of timing advance also requiring signalling of either
    i. said established real time differences
      1. over the X2 (LTE) interface between eNodeBs; the new information elements also providing IDs of said base stations.
      2. from the LTE RAN to a CN positioning node; said new information elements also providing IDs of said base stations.
    ii. or said timing advance measurements
      1. over the X2 (LTE) interface between eNodeBs; the new information elements also providing IDs of said base stations.
      2. from the LTE RAN to a CN positioning node; said new information elements also providing IDs of said base stations.
6) Filtering, either in at least one eNodeB or said CN node, combinations of measured TA, TOA or differences between TOAs, results received in said new information elements.

The main aspects of the invention are described in detail in the following sections.

Figure 3:
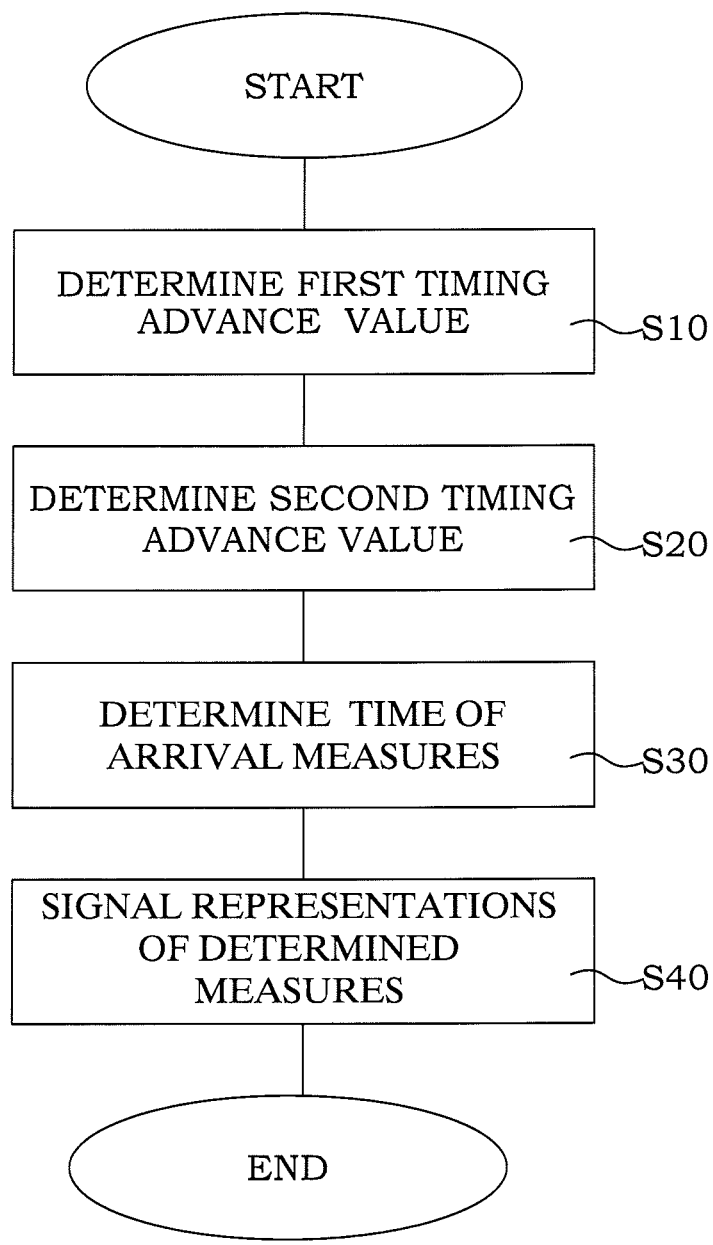
FIG. 3 is a schematic flow chart of an embodiment of a method according to the present invention.

A basic embodiment, with reference to the general system of FIG. 2 and the flow chart of FIG. 3, comprises the steps of determining S10 a first timing advance value representative of a first geographical distance measure between the mobile terminal and a first serving base station e.g. eNodeB prior to a handover to a second serving base station e.g. eNode B, and determining S20 a second timing advance value representative of a second geographical distance measure between the mobile terminal and the second base station e.g. eNodeB after the handover. Subsequently, or in parallel, determining S30 a time of arrival measure between the mobile terminal and at least two eNodeBs, and finally signaling S40 representations of the determined first and second geographical distance measures and said determined time of arrival measures for the mobile terminal to at least the second eNodeB, together with a respective unique identification parameter of the at least two eNodeBs. These measures are subsequently utilized by a position calculation function to determined real time differences. The position calculation function can be located in the actual serving eNodeB, or in another eNodeB, or in a note external of the system.

According to a further embodiment, one of or combinations of the determined measures (TA, TOA, TDOA, calculated differences in transmission time) and unique identification parameters are further exchanged or relayed or signalled over the X2 (LTE) interface between eNodeBs of the system. Preferably, these measures are signalled as new information elements.

According to a second further embodiment, one of or combinations of the determined measures (TA, TOA, TDOA, calculated differences in transmission time) and unique identification parameters are further exchanged or relayed or signalled from the system (LTE RAN) to a CN node. Preferably, these measures are signalled as new information elements.

Finally, either filtering, in at least one eNodeB or said CN node, combinations of measured TA, TOA or differences between TOAs results received in said new information elements.

Determination of Distance Using Timing Advance TA Measurements

In order to be able to solve the previously described equations above for the position of the mobile terminal e.g. $r_{Terminal}$, it is preferable to measure the TDOAs and to have the real time differences determined by other means. In order to determine the real time differences, one basic aspect is to determine the TDOAs and geographical distances of the following equations, $$t_{TDOA,2} = t_{TOA,2} - t_{TOA,1} = T_2 - T_1 + \|r_2 - r_{Terminal}\|/c - \|r_1 - r_{Terminal}\|/c \quad (6_2)$$

$$\vdots$$

$$t_{TDOA,n} = t_{DOA,n} - t_{TOA,1} = T_n - T_1 + \|r_n - r_{Terminal}\|/c - \|r_1 - r_{Terminal}\|/c. \quad (6_n)$$

and to solve for the real time differences. The TDOAs can be measured and signalled to a position calculation node.

According to an embodiment of the present invention, two TA measurements S10 and S20, performed just before and just after a handover, are used for determination of the geographical distances between the mobile terminal and the serving eNodeB. This is necessary since TA is only available for the serving cell. Further, by performing the measurements within a predetermined time prior to and after the handover the terminal is not allowed to move significantly (as compared to the TA resolution of a few 100 meters) between the two TA measurements. Hence the following measurements are performed $$TA_{Before}: |t_{TA_{Before}} - t_{Handover}| < T_{Limit} \quad (7)$$

$$TA_{After}: |t_{TA_{After}} - t_{Handover}| < T_{Limit} \quad (8)$$

where $t_{Handover}$ is the time of the handover and where $T_{Limit}$ is a time limit, such that $$\max(v_{Terminal})T_{Limit} << d_{Re\ sulution,TA} \quad (9).$$

In the last equation $v_{Terminal}$ denotes the speed of the terminal and $d_{Re\ solution,TA}$ is the resolution of the TA measurement as a geographical distance.

Using the above measurements, the first TDOA equation (Equation $6_2$) reduces to $$t_{TDOA,2} = t_{TOA,2} - t_{TOA,1} = T_2 - T_1 + TA_{After}/2 - TA_{Before}/2 \quad (10)$$

Similarly, for the remaining equations, these requiring separate handovers. The division by 2 is due to the fact that the TA measurement relates to the round trip time.

Signalling

The measured first and second TA values need to be signalled over the X2 interface between eNodeBs and may be signalled to nodes outside the LTE RAN. Towards that end, they are each preferably encoded S31 to give encoded representations of the measured TA values e.g. $TA_{Encoded}$. The encoded representations are then transmitted over the interface in question, together with a unique ID of the eNodeB, i.e. as $$TA_{Encoded}, ID_{eNodeB} \quad (11)$$

As a complement or alternative to the above-mentioned TA measurements, it is possible to measure the transmission time $T_2, T_1$ for the second and first eNodeBs to the mobile terminal and calculate the difference.

Measurement of TOA and TDOA

The measurements of TOA can be performed with regard to a single eNodeB, or multiple eNodeBs. In addition, they can be performed before handover between the above mention first and second serving eNodeB, or after handover, or a combination of both, embodiments for all such cases will be described below.

Single TOA Measurement and Signalling

According to a first embodiment of the present invention, a time of arrival (TOA) measurement is performed in association with the first and second TA measurements above. This measurement is according to Equation 12

$$t_{TOA}: |t_{t_{TOA}} - t_{Handover}| < T_{Limit} \quad (12).$$

After measurement it is similarly encoded to give $t_{TOA,Encoded}$. The encoded TOA measure is then signalled from the mobile terminal to the eNodeB over the RRC (LTE) interface, optionally together with the ID of the eNodeB (to provide a general signalling principle, allowing also for signalling of multiple measurements). i.e. as Equation 13

$$t_{TOA,Encoded}, ID_{eNodeB} \quad (13).$$

The information element received in the eNodeB may also be further signaled over the X2 interface to another eNodeB or to a position calculation node outside the LTE RAN.

Multiple TOA Measurements and Signalling

In a second embodiment, time of arrival (TOA) measurement with regard to several eNodeBs are performed in association with the TA measurements above. These measurements are according to Equation 14

$$t_{TOA,i}: |t_{t_{TOA,i}} - t_{Handover}| < T_{Limit}, i=1, \ldots, N_{TOA}, \quad (14)$$

where $N_{TOA}$ denotes the number of TOA measurements that are performed. After measurement the measurements are preferably encoded to give $t_{TOA,i,Encoded}, i=1, \ldots, N_{TOA}$. The encoded measurements are subsequently signaled from the mobile terminal to the serving eNodeB over the RRC (LTE) interface, together with the IDs of the respective eNodeBs, i.e. as Equation 15

$$t_{TOA,i,Encoded}, ID_{i,eNodeB}, i=1, \ldots, N_{TOA} \quad (15).$$

The signalling could be performed either by repetition of the signalling of a single TOA, or in some list, defining a joint information element. The information element received in the eNodeB may also be further signalled over the X2 interface to another eNodeB or to a position calculation node outside the LTE RAN.

TDOA Formation and Signalling

In a third embodiment, time of arrival measurement with regard to several eNodeBs are performed in association with the TA measurements above. These measurement are $$t_{TOA,i}: |t_{t_{TOA,i}} - t_{Handover}| < T_{Limit}, i=1, \ldots, N_{TOA}, \quad (16)$$

where $N_{TOA}$ denotes the number of TOA measurements that are performed. After measurement, the TOA measurements are processed to obtain TDOA (pseudo) measurements, with respect to one selected eNodeB. This gives the TDOAs $$t_{TDOA,j} = t_{TOA,j} - t_{TOA,J}, j=1, \ldots, N_{TOA}, j \neq J. \quad (17)$$

The TDOAs are then encoded to give $t_{TDOA,j,Encoded}$, $j=1, \ldots, N_{TOA}, j \neq J$. They are then signalled from the terminal to the eNodeB over the RRC (LTE) interface, together with the IDs of the eNodeBs, i.e. as $$ID_{J,eNodeB}; t_{TDOA,j,Encoded}, ID_{j,eNodeB}, j=1, \ldots, N_{TOA}, j \neq J. \quad (18)$$

The information element received in the eNodeB may also be further signalled over the X2 interface to another eNodeB or to a position calculation node outside the LTE RAN.

Filtering of Time of Transmission Relations

In case the LTE eNodeBs are not synchronized, the real time differences will drift. A suitable technical solution to keep track of these relations is to continuously update a state estimator, where each real time difference is modelled with a suitable dynamic model. In order to provide an example embodiment of how this filtering is performed, the following integrated random walk model is postulated for each real time difference (with eNode B J serving as the nominal one)

$$\begin{pmatrix} t_{RealtimeDifference,k}(t_i) \\ \& \\ \dot{t}_{RealtimeDifference,k}(t_i) \end{pmatrix} = \quad (19)$$

$$\begin{pmatrix} 1 & t_i - t_{i-1} \\ 0 & 1 \end{pmatrix} \begin{pmatrix} t_{RealtimeDifference,k}(t_{i-1}) \\ \& \\ \dot{t}_{RealtimeDifference,k}(t_{i-1}) \end{pmatrix} + \begin{pmatrix} w_{1,k}(t_{i-1}) \\ w_{2,k}(t_{i-1}) \end{pmatrix}$$

$$t_{MeasuredRealtimedifference,k} = (1 \quad 0) \begin{pmatrix} t_{RealtimeDifference}(t_{j-1}) \\ \& \\ \dot{t}_{RealtimeDifference}(t_{j-1}) \end{pmatrix} + e_k(t_{j-1}) = \quad (20)$$

$$t_{TDOA,k} - TA_{After,k} - TA_{Before,k}$$

$$k = 1, \ldots, N_{ClusterSize}$$

Here $(t_{RealtimeDifference,k} \& \dot{t}_{RealtimeDifference,k})^T$ is the state vector of the dynamic model, $t_i$ is the time of measurement corresponding to the related handover procedure, $(w_{q,k} \; w_{2,k})^T$ is the systems noise, which describes the modelling uncertainty, $t_{MeasuredRealtimDifference,k}$ is the measured real time difference, and $e_k$ is the measurement noise. In order to preserve the accuracy, it is essential that local clusters of real time differences are processed. If this is not done, chains of subtractions of TAs may occur, resulting in aggregation of uncertainty. The filtering is typically performed using a Kalman filter [1]. The application of this filter requires that the statistical properties of the noises of the above model are provided. The exact definition is beyond the scope of the invention, however the noises are $$R_1 = E\left[\begin{pmatrix} w_{1,k} \\ w_{2,k} \end{pmatrix} (w_{1,k} \; w_{2,k})\right] \text{(systems noise covariance matrix)} \quad (21)$$

$$R_2 = E[e_k^2] \text{(measurement noise variance)} \quad (22)$$

$$k = 1, \ldots, N_{ClusterSize},$$

where E[ ] denotes statistical expectation.

Providing Filtered Information to the Position Calculation Function

The output of the bank of Kalman filters is finally provided to the position calculation function, which is typically (but not necessarily) located in the same node as the filtering of real time differences.

In addition, the present disclosure provides the signalling means required for signalling said measured TA, TOA(s) or TDOA(s), from the mobile terminal to the eNodeB, between eNodeBs and from eNodeBs to nodes external to the LTE RAN, and the filtering of time of transmission relations between eNodeBs.

Figure 5:
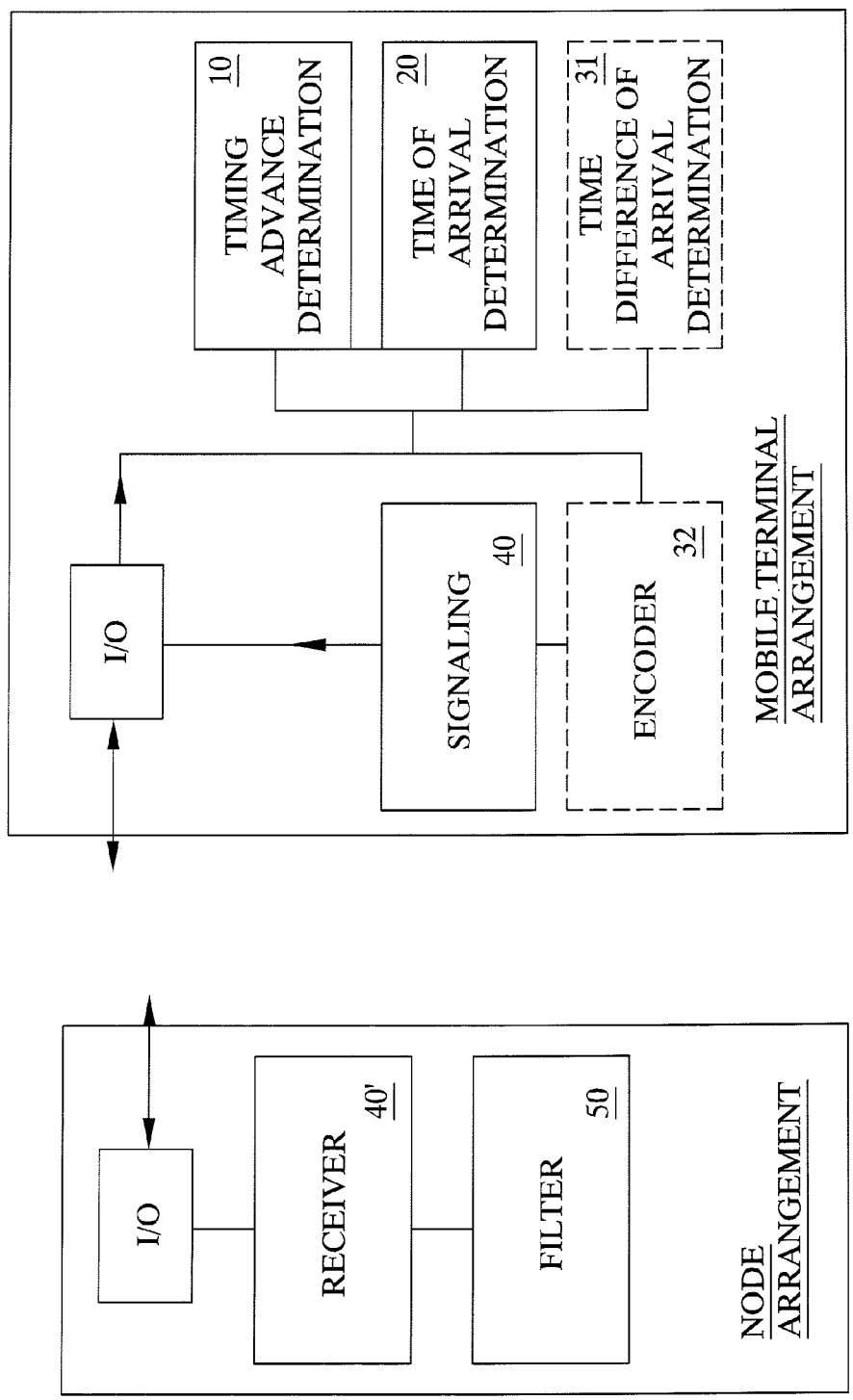
FIG. 5 is a schematic block chart of an embodiment of an arrangement according to the present invention.

With reference to FIG. 5, an embodiment of an arrangement for providing real time difference determination for a mobile terminal of the present invention will be described. The arrangement is preferably located in a mobile terminal such as a mobile phone, laptop, PDA or similar.

The arrangement comprises a general input/output unit according to well known practices. A distance determinator 10 for determining first and second timing advance measures prior to and after handover respectively, these measure are representative of a first and second geographical distance measure or value between the mobile terminal and its serving base station e.g. eNodeB. Further the arrangement includes a timer 30 configured for determining a time of arrival measure between the mobile terminal and two or more nodes in the system. Finally, the arrangement comprises a signal unit 40 for signalling the determined values or measures, or representations thereof to at least the serving node e.g. second eNodeB. Each measure is preferably signalled together with a unique identification parameter for the eNodeB in question. Consequently, determination of real time differences is enabled based on the signalled representations.

Figure 4:
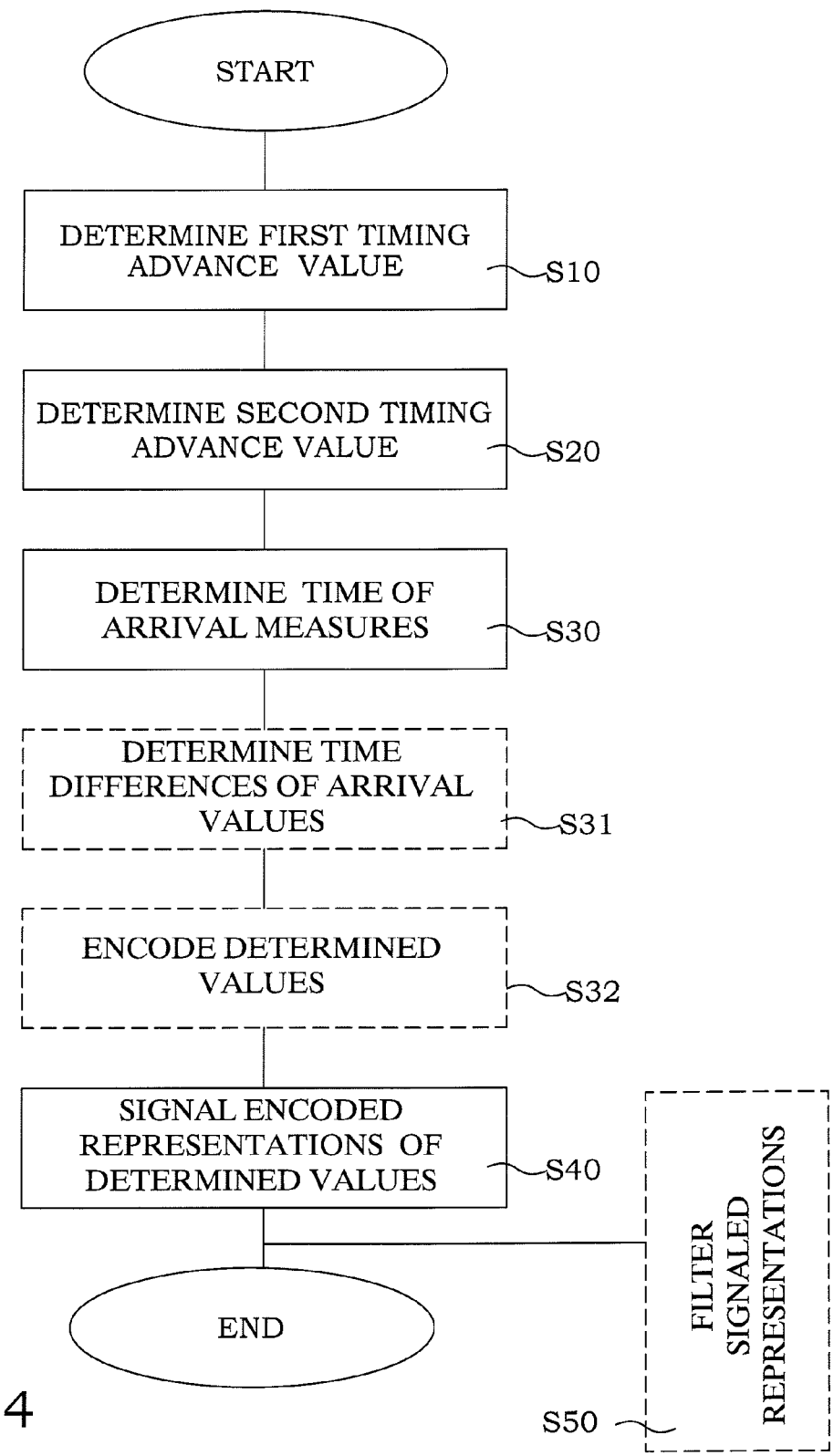
FIG. 4 is a schematic flow chart of a further embodiment of a method according to the present invention.

Also with reference to FIG. 4, a further embodiment includes a differencing unit 31 configured to determine time differences of arrival measures for the mobile terminal relative a plurality of cells. The signalling unit 40 is adapted to also signal representations of the time differences of arrival measures together with a unique identification parameter. Also, an encoder 32 is provided to encode the measures to provide the representations for signalling.

In addition, although the embodiments described above disclose measuring TOA for a serving cell, it is quite possible to measure the TOA for the targeted handover cell prior to the handover. Assuming that the terminal does not move significantly between the measurement and the actual handover.

Further, with reference to FIG. 4, a node according to the present invention is disclosed. The node comprises, besides a general I/O unit, a receiver 40' adapted to receive the above mentioned signalled representations from the mobile terminal, or from a eNodeB in the system. According to a further embodiment the node comprises a filter 50 adapted to filter the real time differences e.g. by means of a Kalman filter or some other similar filter arrangement. The node is further adapted to relay the received representations to eNodeBs in the system, or to nodes external of the system.

In summary, the present invention discloses methods and arrangements, preferably located in a mobile terminal, adapted for determining and/or measuring and/or calculating TA, TOA and TDOA for the terminal. Additionally, disclosing methods and arrangements enabling signalling of TA, TOA, and TDOA measured and/or calculated at the terminal to its serving eNodeB. In addition, the invention discloses arrangements for enabling signaling of said values between eNodeBs and to nodes outside the LTE RAN. Further, the present invention discloses arrangements for providing filtering of the time of transmission relations between eNodeBs.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] T. Söderström, Discrete Time Stochastic Systems. London, UK: Springer, 2002.
[2] E. Dahlman et.al, 3G Evolution: HSPA and LTE for Mobile Broadband, ISBN 97801237525332, pp 380-382

The invention claimed is:

1. A method of providing real time difference determination for a mobile terminal in a telecommunication system, said system comprising a plurality of eNodeBs in communication with a core network, each eNodeB having a plurality of associated cells, each cell potentially servicing one or more mobile terminals, said method comprising:
   determining a first timing advance value representative of a first geographical distance measure between said mobile terminal and a first serving eNodeB prior to a handover to a second serving eNodeB;
   determining a second timing advance value representative of a second geographical distance measure between said mobile terminal and said second eNodeB after said handover;
   determining at least a time of arrival measure between said mobile terminal and at least two of the plurality of eNodeBs; and
   signalling representations of said first and second geographical distance measures and said determined time of arrival measures for said mobile terminal to at least said second eNodeB, together with a respective unique identification parameter of said at least two eNodeBs, to enable determination of real time differences based on at least said signalled representations.

2. The method according to claim 1, further comprising determining said first and second timing advance values representative of said first and second geographical distance measures within a predetermined time interval relative to said handover.

3. The method according to claim 1, wherein determining said time of arrival measures between said mobile terminal and at least two of the plurality of eNodeBs comprises determining said time of arrival measures between said mobile terminal and said first eNodeB, or between said mobile terminal and said second eNodeB prior to handover.

4. The method according to claim 1, wherein determining said time of arrival measures between said mobile terminal and at least two of the plurality of eNodeBs comprises determining said time of arrival measures between said mobile terminal and each of said plurality of eNodeBs.

5. The method according to claim 4, further comprising determining time differences of arrival for said mobile terminal based on said determined time differences of arrival measures.

6. The method according to claim 5, wherein signalling representations further includes signalling representations of said determined time differences of arrival.

7. The method according to claim 6, characterized by signalling said representations of said time differences of arrival measures together with the respective unique identification parameter as one information element according to:

$$ID_{J,eNodeB}, t_{TDOA,j,Encoded}, ID_{j,eNodeB} \; j=1,\ldots,NTDOA, \; j \neq J$$

where $ID_{J,eNodeB}$ represents the unique identification parameter of eNodeB J, $t_{TDOA,j,Encoded}$ represents the encoded time difference of arrival measures relative to the eNodeB J, and $ID_{j,eNodeB}$ represents the respective unique identification parameters of the eNodeBs.

8. The method according to claim 6, further comprising encoding said determined time differences of arrival to provide said signal representations.

9. The method according to claim 1, further comprising encoding said determined first and second geographical distance measures and said determined time of arrival measures to provide said signaled representations of said distance measures and said time of arrival measures.

10. The method according to claim 9, wherein signalling said representations of said first and second geographical distance measures comprises signalling said first and second timing advance values together with the respective unique identification parameter as one information element according to:

$$TA_{Encoded}, ID_{eNodeB}$$

where $TA_{Encoded}$ represents the encoded timing advance measure, and $ID_{eNodeB}$ represents the unique identification parameter.

11. The method according to claim 9, wherein signalling said representations of said determined time of arrival measures comprises signalling representations of said at least one time of arrival measure together with the respective unique identification parameter as one information element according to:

$$t_{TOA,Encoded}, ID_{eNodeB}$$

where $t_{TOA,Encoded}$ represents the encoded time of arrival measure, and $ID_{eNodeB}$ represents the unique identification parameter.

12. The method according to claim 9, wherein determining said time of arrival measures between said mobile terminal and at least two of the plurality of eNodeBs comprises determining said time of arrival measures between said mobile terminal and each of said plurality of eNodeBs, and wherein signalling said representations of said time of arrival measures together with the respective unique identification parameter comprises signaling said representations of said time of arrival measures together with the respective unique identification parameter as one information element according to:

$$t_{TOA,i,Encoded}, ID_{i,eNodeB} \; i=1,\ldots,NTOA$$

where $t_{TOA,i,Encoded}$ represents the encoded time of arrival measures for all the i eNodeBs, and $ID_{i,eNodeB}$ represents the respective unique identification parameters.

13. The method according to claim 1, further comprising signalling said representations of said determined first and second geographical distance measures and said determined time of arrival measures, or representations thereof, to at least one more eNodeB in said telecommunication system.

14. The method according to claim 1, further comprising signalling said representations of said determined first and second geographical distance measures and said determined time of arrival measures, or representations thereof, to a node outside said telecommunication system.

15. The method according to claim 14, wherein said node outside said telecommunication system comprises a position calculation node outside said telecommunication system.

16. The method according to claim 1, filtering said real time differences, and providing said filtered real time differences to a position calculation function.

17. The method according to claim 16, wherein filtering said real time differences comprises Kalman filtering of said determined real time differences.

18. The method according to claim 1, wherein signalling said representations and said unique identification parameters comprises signalling said representations of said determined first and second geographical distance measures and said unique identification parameters as one information element.

19. An apparatus configured to provide real time difference determination for a mobile terminal in a telecommunication system, said system comprising a plurality of eNodeBs in communication with a core network, each eNodeB having a plurality of associated cells, each cell potentially servicing one or more mobile terminals, said apparatus comprising:

a distance determinator configured to determine a first timing advance value representative of a first geographical distance measure between said mobile terminal and a first serving eNodeB prior to a handover to a second serving eNodeB, and to determine a second timing advance value representative of a second geographical distance measure between said mobile terminal and said second eNodeB after said handover;

a timer configured to determine a time of arrival measure between said mobile terminal and at least two of the plurality of eNodeBs; and a signal unit configured to signal representations of said determined first and second geographical distance measures and said determined time of arrival measures for said mobile terminal to at least said second eNodeB, together with a respective unique identification parameter of said at least two eNodeBs, to enable determination of real time differences based on at least said signalled representations.

20. The apparatus according to claim 19, further comprising a differencing unit configured to determine time differences of arrival for said mobile terminal based on said determined time of arrival measures.

21. The apparatus according to claim 19, further comprising an encoder configured to encode said determined first and second geographical distance measures and said determined time of arrival measures to provide said signalled representations of said distance measures and said time of arrival measures.

22. The apparatus of claim 19, wherein the apparatus comprises a mobile terminal.

23. An eNodeB in a telecommunication system, said eNodeB comprising a receiver configured to receive representations of determined first and second geographical distance measures for a mobile terminal and a first and second eNodeB prior to and after a handover, and representations of determined time of arrival measures for said mobile terminal relative to at least two of a plurality of eNodeBs in the telecommunication system, together with a respective unique identification parameter of said at least two eNodeBs, wherein determination of real time differences is enabled based on at least said received representations.

24. The eNodeB according to claim 23, wherein said receiver is further configured to relay said received representations together with said unique identification parameters to at least one other eNodeB in the telecommunication system.

25. The eNodeB according to claim 24, wherein said receiver is further configured to relay said received representations together with said unique identification parameters to at least one node outside the telecommunication system.

26. The eNodeB according to claim 24, further comprising a filter configured to filter said received representations of said determined real time differences, and to provide said filtered real time differences to a position calculation function.

* * * * *

UNITED STATES PATENT AND TRADEMARK OFFICE
CERTIFICATE OF CORRECTION

PATENT NO. : 8,489,098 B2
APPLICATION NO. : 13/148190
DATED : July 16, 2013
INVENTOR(S) : Wigren et al.

It is certified that error appears in the above-identified patent and that said Letters Patent is hereby corrected as shown below:

On the Title Page, Item (57), under "ABSTRACT", in Column 2, Line 6, delete "S1O" and insert -- S10 --, therefor.

In the Specification

In Column 3, Line 19, delete "implemented." and insert -- implemented; --, therefor.

In Column 4, Lines 2-7, delete "The so-called ......... in FIG. 1." and insert the same at line 3 as a new paragraph, therefor.

In Column 4, Line 22, in Equation (1), delete "$t_{DOA,1}$" and insert -- $t_{TOA,1}$ --, therefor.

In Column 4, Line 26, in Equation (2), delete "$t_{DOA,n}$" and insert -- $t_{TOA,n}$ --, therefor.

In Column 4, Line 43, in Equation ($3_n$), delete "$t_{DOA,n}$" and insert -- $t_{TOA,n}$ --, therefor.

In Column 7, Line 9, in Equation ($6_n$), delete "$t_{DOA,n}$" and insert -- $t_{TOA,n}$ --, therefor.

In Column 7, Line 32, in Equation (9), delete "$d_{Re\ sulution,TA}$" and insert -- $d_{Re\ solution,TA}$ --, therefor.

In Column 8, Line 17, delete "measurements)." and insert -- measurements), --, therefor.

In Column 8, Line 29, in Equation (14), delete "$t_{Handover} < T_{Limit},$" and insert -- $t_{Handover}| < T_{Limit}$, --, therefor.

In Column 8, Line 58, delete "give$^t_{TDOA,j,Encoded}$," and insert -- give $t_{TDOA,j,Encoded}$, --, therefor.

Signed and Sealed this
Thirteenth Day of May, 2014

Michelle K. Lee
*Deputy Director of the United States Patent and Trademark Office*

CERTIFICATE OF CORRECTION (continued)
U.S. Pat. No. 8,489,098 B2

In Column 9, Line 31, delete "$t_{MeasuredRealtimDifference,k}$" and insert -- $t_{MeasuredRealtimeDifference,k}$ --, therefor.

In Column 10, Line 66, delete "E. Dahlman et.al," and insert -- E. Dahlman et al., --, therefor.

In Column 10, Line 67, delete "pp 380-382" and insert -- pp. 380-382. --, therefor.

In the Claims

In Column 11, Line 55, in Claim 7, delete "j=1,...,NTDOA," and insert -- J=1,...,$N_{TDOA}$, --, therefor.

In Column 12, Line 37, in Claim 12, delete "i=1,...,NTOA" and insert -- i=1,...,$N_{TOA}$ --, therefor.